(12) United States Patent
Tsai et al.

(10) Patent No.: US 12,337,686 B2
(45) Date of Patent: Jun. 24, 2025

(54) METHODS FOR CONTROLLING A SEQUENCE OF VEHICLE ACTIONS USING A NON-FUNGIBLE TOKEN

(71) Applicant: Toyota Connected North America, Inc., Plano, TX (US)

(72) Inventors: David Tsai, Irvine, CA (US); Will Hargis, Celina, TX (US); Charan S. Lota, Frisco, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 280 days.

(21) Appl. No.: 18/304,846

(22) Filed: Apr. 21, 2023

(65) Prior Publication Data

US 2024/0351434 A1    Oct. 24, 2024

(51) Int. Cl.
*B60K 35/00*    (2024.01)
*H04L 9/00*    (2022.01)
*B60K 35/28*    (2024.01)
*B60K 35/85*    (2024.01)

(52) U.S. Cl.
CPC .............. *B60K 35/00* (2013.01); *H04L 9/50* (2022.05); *B60K 35/28* (2024.01); *B60K 35/85* (2024.01); *B60K 2360/177* (2024.01); *B60K 2360/33* (2024.01); *H04L 2209/84* (2013.01)

(58) Field of Classification Search
CPC ........ B60K 35/00; B60K 35/28; B60K 35/85; B60K 2360/177; B60K 2360/33; H04L 9/50; H04L 2209/84; H04L 9/3239
See application file for complete search history.

(56) References Cited

U.S. PATENT DOCUMENTS

| | | | |
|---|---|---|---|
| 8,881,259 B2 * | 11/2014 | Ferdinand | H04L 63/0236 |
| | | | 713/157 |
| 10,682,981 B2 | 6/2020 | Pepe et al. | |
| 10,751,628 B2 | 8/2020 | Packin et al. | |
| 11,484,790 B2 * | 11/2022 | Buxton, II | G09B 9/04 |
| 2016/0261599 A1 | 9/2016 | Perry et al. | |
| 2020/0357198 A1 | 11/2020 | Bennett et al. | |

(Continued)

FOREIGN PATENT DOCUMENTS

CN    108597128 A    9/2018

*Primary Examiner* — Richard M Camby
(74) *Attorney, Agent, or Firm* — DINSMORE & SHOHL LLP (57) ABSTRACT

Methods for generating a non-fungible token for controlling a physical vehicle and methods of controlling a physical vehicle are disclosed. In one embodiment, a method of generating a non-fungible token for controlling a physical vehicle includes generating a virtual vehicle within a virtual environment, wherein the virtual vehicle corresponds to the physical vehicle, receiving, within the virtual environment, requests corresponding to a sequence of actions for one or more virtual vehicle components, controlling the virtual vehicle such that the virtual vehicle performs the sequence of actions, generating instructions for performing the sequence of actions by the physical vehicle, and generating the non-fungible token, wherein the non-fungible token comprises the instructions for performing the sequence of actions by the physical vehicle such that the non-fungible token is configured to control one or more physical vehicle components of the physical vehicle to perform the sequence of actions.

20 Claims, 7 Drawing Sheets

(56) References Cited

U.S. PATENT DOCUMENTS

| | | |
|---|---|---|
| 2021/0279695 A1 | 9/2021 | Rice |
| 2021/0398095 A1 | 12/2021 | Mallett et al. |
| 2023/0009175 A1* | 1/2023 | Wang ................... F16M 11/041 |
| 2023/0196786 A1* | 6/2023 | Liem ..................... G01S 7/4052 |
| | | 348/148 |
| 2024/0104982 A1* | 3/2024 | Tsai ...................... A63F 13/803 |

* cited by examiner

METHODS FOR CONTROLLING A SEQUENCE OF VEHICLE ACTIONS USING A NON-FUNGIBLE TOKEN

TECHNICAL FIELD

The present specification relates to vehicle control and, more particularly, to controlling vehicle actions using a non-fungible token.

BACKGROUND

Today's vehicles are becoming increasing customizable. For example, a vehicle owner may want certain colored interior and/or exterior lights, and for those lights to perform in a certain manner.

Accordingly, a need exists for alternative methods of controlling vehicle components.

SUMMARY

In one embodiment, a method of generating a non-fungible token for controlling a physical vehicle includes generating a virtual vehicle within a virtual environment, wherein the virtual vehicle corresponds to the physical vehicle, receiving, within the virtual environment, requests corresponding to a sequence of actions for one or more virtual vehicle components, controlling the virtual vehicle such that the virtual vehicle performs the sequence of actions, generating instructions for performing the sequence of actions by the physical vehicle, and generating the non-fungible token, wherein the non-fungible token comprises the instructions for performing the sequence of actions by the physical vehicle such that the non-fungible token is configured to control one or more physical vehicle components of the physical vehicle to perform the sequence of actions.

In another embodiment, a method of controlling a vehicle includes receiving, by one or more processors of a vehicle, a non-fungible token comprising instructions for controlling one or more components of the vehicle such that the one or more components perform a sequence of actions, and executing, by the one or more processors, the instructions to generate a plurality of signals, wherein the plurality of signals control the one or more components such that the one or more components perform the sequence of actions.

In yet another embodiment, a method of controlling a physical vehicle includes generating a virtual vehicle within a virtual environment, wherein the virtual vehicle corresponds to the physical vehicle, receiving, within the virtual environment, requests corresponding to a sequence of actions for one or more virtual vehicle components, controlling the virtual vehicle such that the virtual vehicle performs the sequence of actions, generating instructions for performing the sequence of actions by the physical vehicle, and generating a non-fungible token, wherein the non-fungible token comprises the instructions for performing the sequence of actions by the physical vehicle such that the non-fungible token is configured to control one or more physical vehicle components of the physical vehicle to perform the sequence of actions. The method further includes receiving, by one or more processors of a vehicle, the non-fungible token, and executing, by the one or more processors, the instructions to generate a plurality of signals, wherein the plurality of signals control the one or more physical vehicle components such that the one or more physical vehicle components perform the sequence of actions

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for creating non-fungible tokens that are configured to control a physical vehicle to perform a "show" by performing a sequence of actions. Thus, the physical vehicle may appear to "dance" and/or "sing." For example, the vehicle may play a song, and flash lights, move mirrors and wheels and/or the like in a manner that is choreographed to the song. Presently there is no way for a vehicle owner to create such a vehicular performance. A vehicle manufacturer may provide the capability of a performance, but the owner is not able to create performances. The vehicle owner may desire to customize his or her vehicle with one or more performances.

Embodiments of the present disclosure provide an immersive virtual environment for a user (e.g., a vehicle owner) to create a performance for a physical vehicle using a virtual vehicle within the virtual environment. The user may control vehicle components (e.g., lights, mirror, and the like) of the virtual vehicle and record a sequence of these actions. The user can cause the virtual vehicle to play or otherwise perform the sequence of actions in the virtual environment. In this manner, the user can see how a physical vehicle would perform the sequence of vehicle component actions by viewing the virtual vehicle.

Embodiments also provide for automatic generation of instructions for controlling a physical vehicle according to the make, model, trim level, and/or year of the physical vehicle. These instructions are then converted to a token (e.g., a non-fungible token) that is provided on a blockchain (e.g., the Ethereum blockchain). This token may be accessed by the physical vehicle and, upon selection by a user, the instructions executed to perform the sequence of vehicle component actions. This token can be sold, traded, loaned, and/or the like. Thus, token has inherent value, and can be used to authenticate the instructions for the vehicle performance.

Various embodiments of methods for generating a non-fungible token for controlling a physical vehicle are described in detail below.

Figure 1:
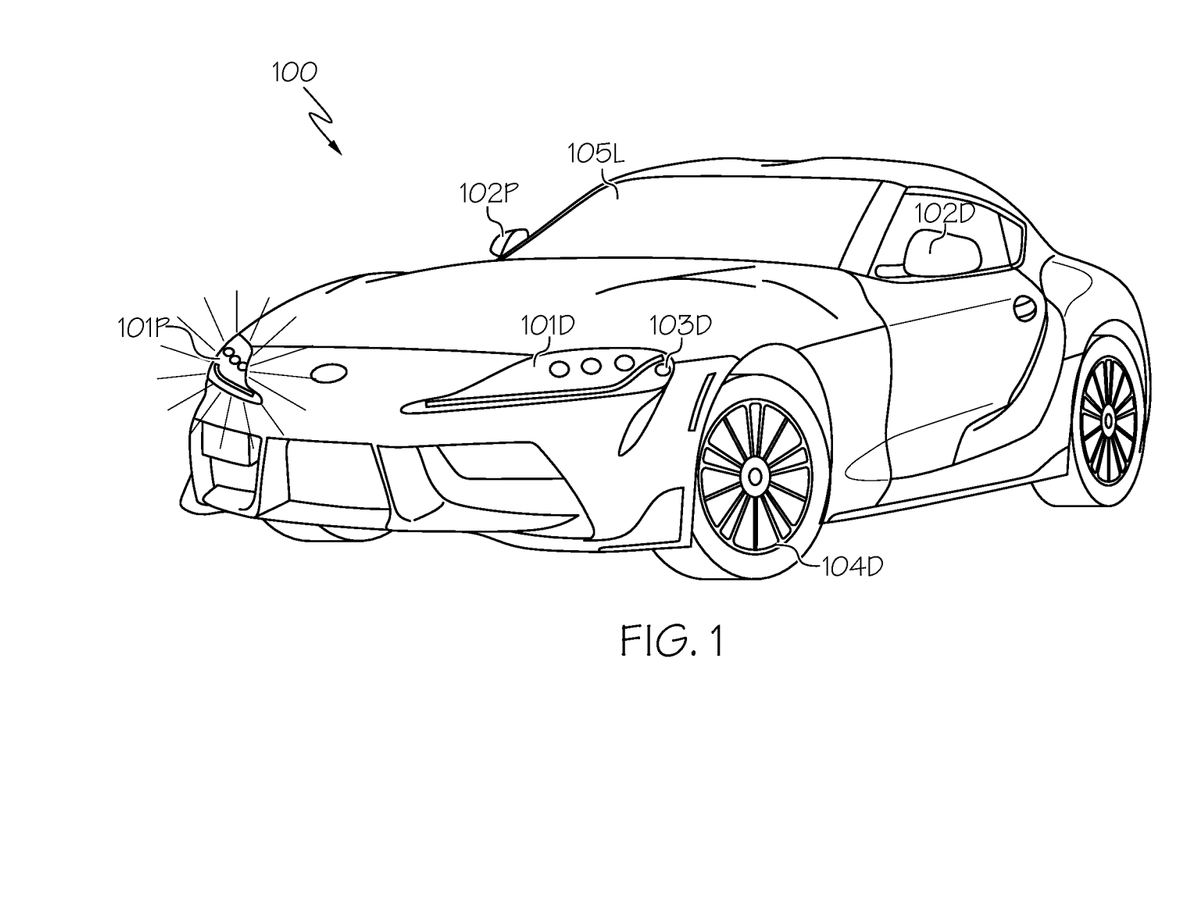
FIG. 1 illustrates a front perspective view of a physical vehicle for executing a non-fungible token for performing a sequence of vehicle component actions according to one or more embodiments described and illustrated herein.
Figure 2:
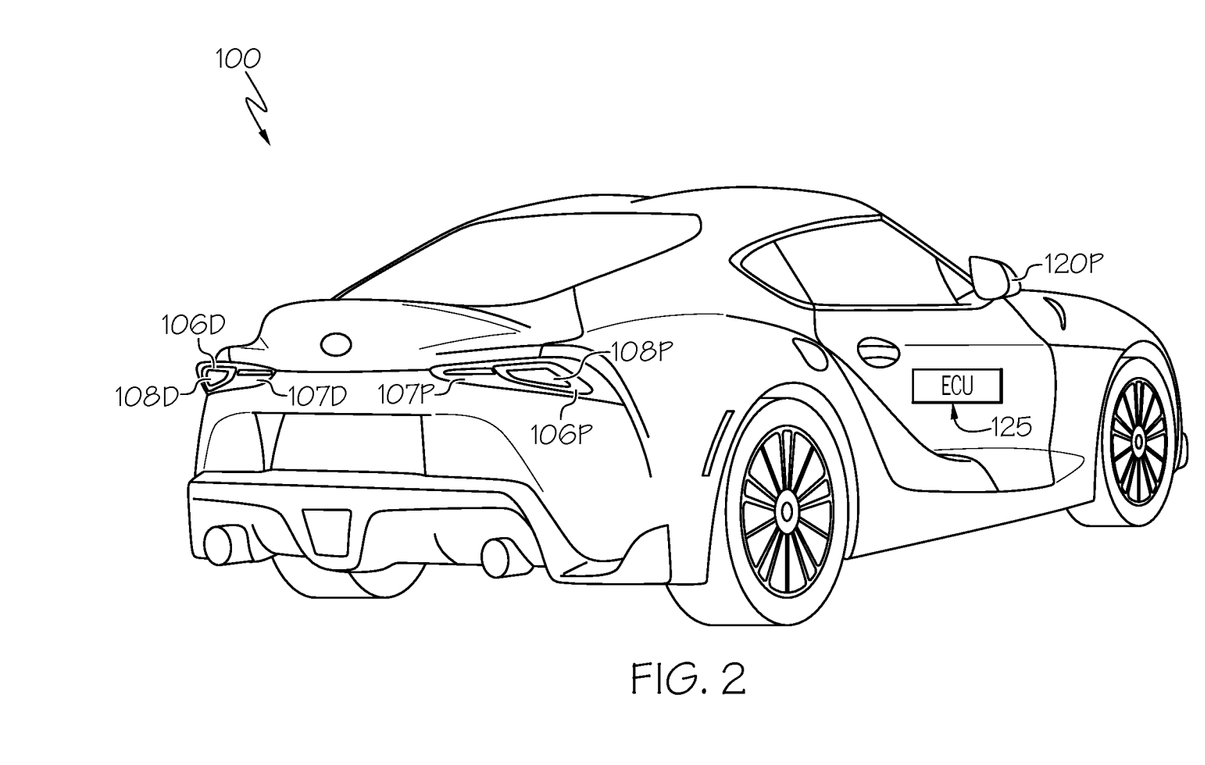
FIG. 2 illustrates a rear perspective view of the physical vehicle of FIG. 1 according to one or more embodiments described and illustrated herein.

FIG. 1 illustrates a non-limiting, example physical vehicle 100 according to one or more embodiments described an illustrated herein. It should be understood that vehicles of the present disclosure are not limited to automobiles, but may also include trucks, watercraft, aircraft, all-terrain vehicles, and the like. The physical vehicle 100 illustrated by FIG. 1 is a sports car. The physical vehicle 100 has a plurality of components, which include a passenger-side headlight 101P, a driver-side headlight 101D, a passenger-side mirror 102P, a driver-side mirror 102D, a passenger-side front turn signal light (not visible in FIG. 1), a driver-side front turn signal light 103D, a passenger-side front wheel (not visible in FIG. 1), a driver-side front wheel 104D, and one or more interior lights 105L, among others. Referring to FIG. 2, a rear-view of the physical vehicle 100 shown in FIG. 1 is provided. The plurality of components may also include a driver-side brake light 106D, a passenger-side brake-light 106P, a driver-side tail light 107D, a passenger-side tail light 107P, a driver-side turn signal light 108D, and a passenger-side turn signal light 108P, among others. As described in more detail below, these components and others may be controlled according to a sequence as defined by a non-fungible token. In some embodiments, the components include third-party accessories, such as sirens, light bars, fog lamps, under-body lights, and the like. The sequential actions may provide a choreographed show for onlookers. Each non-fungible token may provide a different choreographed show.

Figure 3:
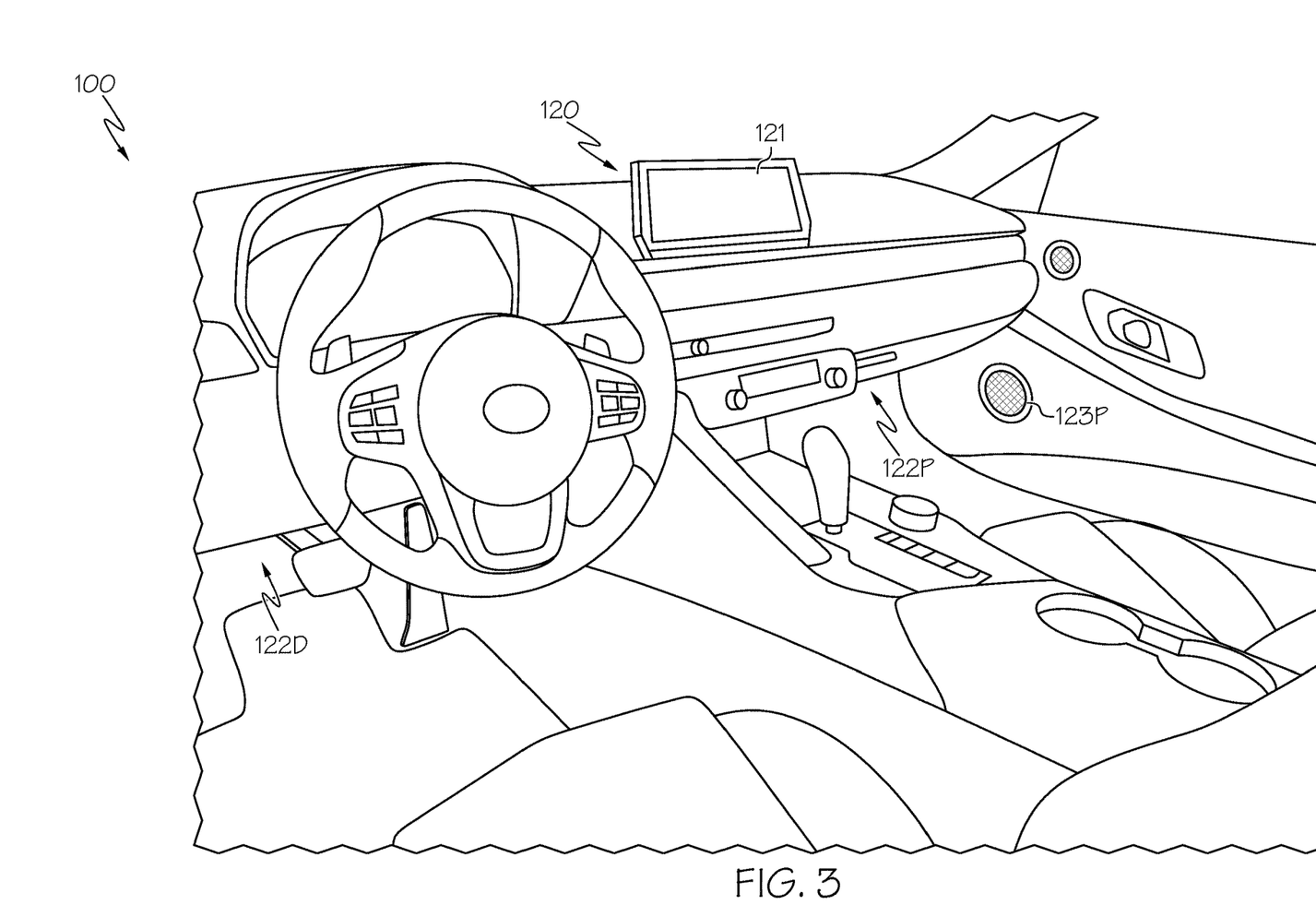
FIG. 3 illustrates an interior view of the physical vehicle of FIGS. 1 and 2 according to one or more embodiments described and illustrated herein.

FIG. 3 illustrates an example interior cabin 120 of the physical vehicle 100 depicted by FIGS. 1 and 2. The interior cabin 120 may include any number of components that may be controlled according to the sequence, such as driver-side foot well 122D, passenger-side foot well 122P, a passenger-side door speaker 123P, a driver-side door speaker, an external speaker, (not visible in FIG. 3), and the like. These interior components may also be controlled according to the sequence.

The plurality of components may be individually controlled in a sequence. FIG. 1 illustrates that the passenger-side headlight 101P is illuminated and the driver-side mirror 102D moves back and forth at a particular period of time. At the next period of time, the driver-side headlight 101D may illuminate. The components of the physical vehicle 100 may be activated (e.g., light up, move, etc.) in any combination according to a sequence over a period of time to provide a choreographed show.

As described in more detail below, a non-fungible token provides instructions for execution by one or more processors of the physical vehicle 100, such as an electronic control unit 125 (see FIG. 2). The instructions, when executed by the one or more processors, cause the one or more processors, along with any other components, to provide signals to the plurality of components to control the plurality of components according to the sequence. For example, the instructions may cause a voltage to be generated and applied to the passenger-side headlight 101P to illuminate it according to the sequence that defines the choreographed show. As another example, control signals may be generated and provided to the driver-side mirror 102D to move it back and forth.

The instructions may be configured to be executed by different makes, models, trim levels and/or years of vehicles. For example, software code needed to control one or more components of a 2022 Toyota Supra may be different from software code needed to control one or more components of a 2019 4Runner.

The instructions are provided by a non-fungible token 119 (see FIG. 3). The non-fungible token 119 may be stored in a blockchain, such as the Ethereum blockchain. The non-fungible token may reference one or more digital files that include the instructions for controlling the one or more components of the vehicle.

In some embodiments, the physical vehicle 100 includes a head unit 121 that has a screen displaying one or more graphical user interfaces. One of the graphical user interfaces may provide a token wallet (e.g., a non-fungible token wallet) that displays all of the non-fungible tokens owned by the vehicle owner. For example, the vehicle owner may log into an account of the token wallet through the head unit 121, which provides access to all of the non-fungible tokens owned by the vehicle owner. Any non-fungible tokens may be provided, such as digital artwork tokens, sound tokens, and the like.

One or more of the displayed non-fungible tokens may include the non-fungible tokens capable of controlling the vehicle components to put on the choreographed show. Upon selection of a non-fungible token, the one or more files including the instructions for controlling the plurality of components according to the sequence is accessed and executed by one or more processors of the physical vehicle 100, such as a processor of the head unit and/or an electronic control unit 125. The one or more processors cooperate with additional hardware to generate the control signals for the appropriate components to control the components according to the sequence such that the choreographed show is performed.

Storage of the instructions for performing the sequence in a non-fungible token ensures that the resulting choreographed show is unique, and can only be performed by a person holding the appropriate non-fungible token. Thus, the non-fungible tokens capable of producing a choreographed vehicle show may have value. These non-fungible tokens may be traded, sold, rented and the like. A non-fungible token providing particularly complex choreographed show set to popular music may be very desirable to users. In another example, a non-fungible token providing a choreographed show developed by a famous artist may also be very desirable.

Figure 4:
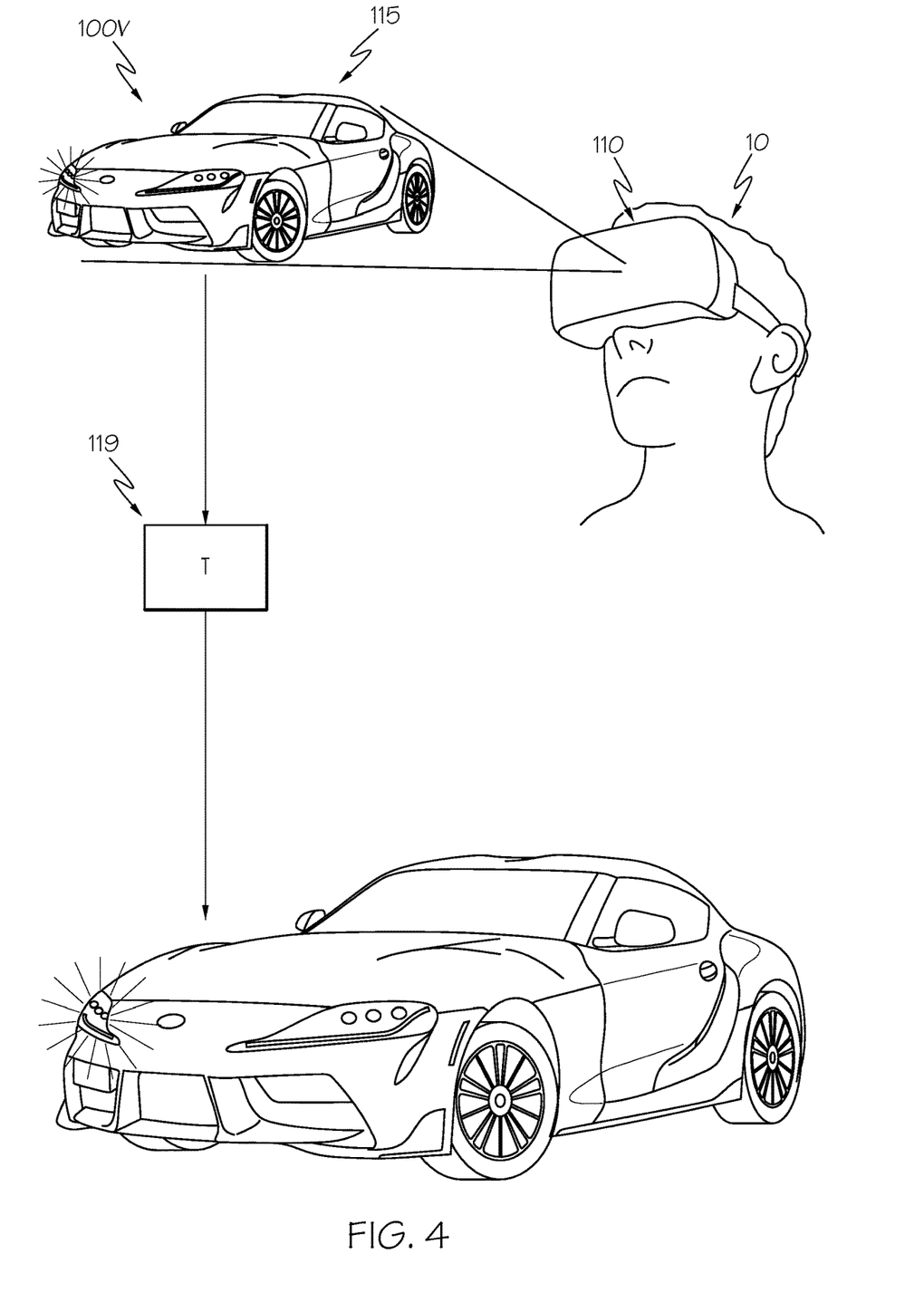
FIG. 4 illustrates a user of a virtual reality headset that renders a virtual vehicle in a virtual environment that is used to generate a token for controlling a physical vehicle according to one or more embodiments described and illustrated herein.

Embodiments of the present disclosure include systems and methods for developing non-fungible tokens representing a sequence of controlled vehicle components that define a choreographed show. FIG. 4 illustrates an example system for developing such non-fungible tokens. In the illustrated embodiment, a user accesses a virtual environment 115 using appropriate hardware, which is shown as a virtual reality headset. Thus, the virtual environment 115 is a virtual reality environment. In other embodiments, the virtual environment 115 may be an augmented reality environment where virtual objects are overlaid on the physical environment. In augmented reality embodiments, the appropriate hardware may be augmented reality glasses, for example.

A virtual vehicle 100V corresponding to a physical vehicle 100 for which the sequence is developed for is displayed. A user 10 may have the option to select a make, model, trim-level and year of the physical vehicle he or she is developing a sequence for. As stated above, different vehicles may have different components, as well as require different software code for controlling those components.

Upon selection of the desired vehicle, a virtual vehicle 100V may be rendered in the virtual environment 115. The user 10 may be able to walk around the virtual vehicle 100V, rotate the virtual vehicle 100V or otherwise get any needed view of the virtual vehicle 100V. The user 10 may also have the ability to add additional components beyond factory components, such as aftermarket accessories.

After the virtual vehicle 100V is set, the user 10 may use an interface to develop a sequence of activating and de-activating vehicle components in various combinations over a period of time. Components may be turned on and off as desired to develop a choreographed show. In some embodiments, one of the components is the sound system of the vehicle, and the user may select which song or songs are played during the choreographed show.

Figure 5:
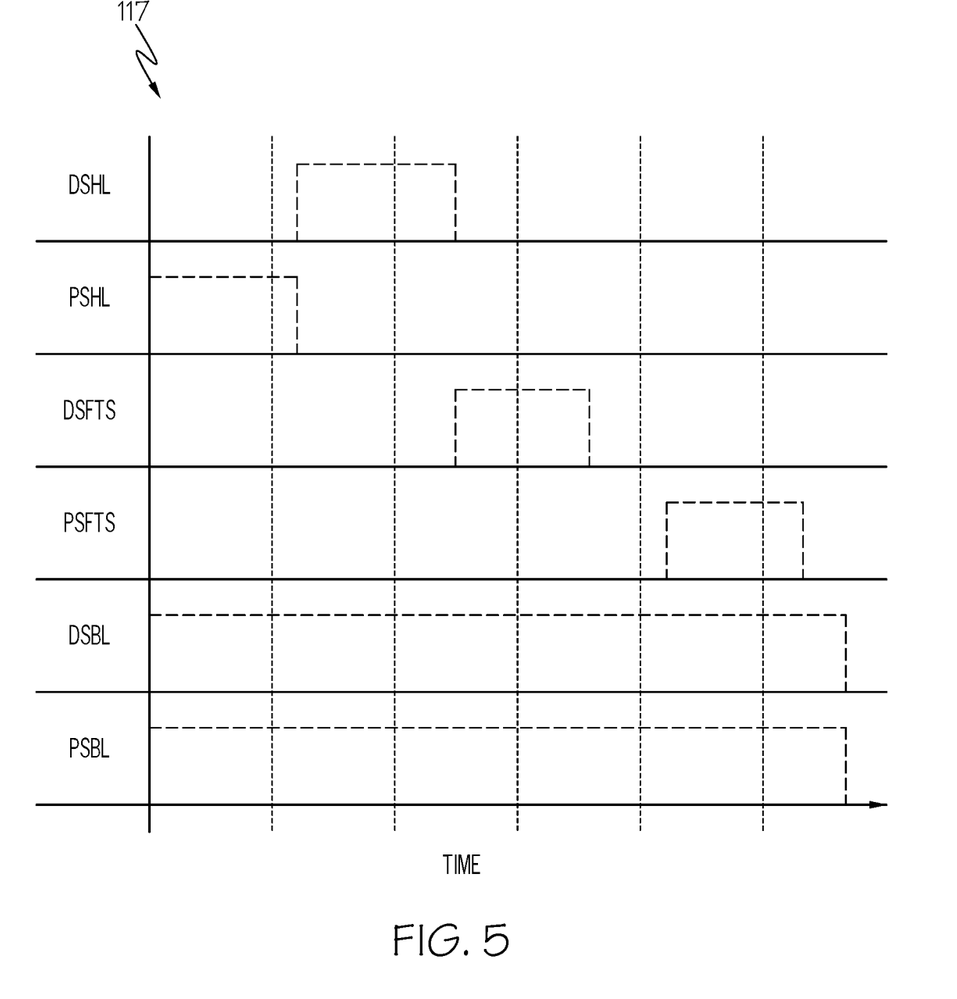
FIG. 5 illustrates an example user interface for generating a sequence of vehicle component actions according to one or more embodiments described and illustrated herein.

FIG. 5 illustrates a non-limiting user interface 117 that may be displayed using the hardware (e.g., virtual reality headset 110) that may be used to develop the desired sequence. As shown in FIG. 5, the x-axis is time, which defines the period of time for the choreographed show. The y-axis includes the components of the virtual vehicle 100V that are being controlled, such as the driver-side head light (DSHL), passenger-side head light (PSHL), driver side front turn signal (DSFTS), passenger-side front turn signal (PSFTS), driver-side brake light (DSBL), and passenger-side brake light (PSBL). It should be understood that other components may also be displayed. The user interface 117 enables users to visualize which component are on or off at which points in time. The user interface 117 also enables users to time when components are on and off at certain points of a song or songs.

In some embodiments, the user 10 may turn on virtual vehicle components of the virtual vehicle 100V by touching them or otherwise gesturing to them. For example, to turn on a driver-side headlight, the user 10 may touch the headlight for it to turn off, and touch it again to turn it off. In this manner, the system receives requests to turn on, turn off, or otherwise activate/de-activate components at points in time over a time period.

The user 10 may then replay the sequence of components to "play" the choreographed show on the virtual vehicle 10. This enables the user 10 to both see and hear how the choreographed show will appear and sound to onlookers when the choreographed show is performed on the physical vehicle 100. The user 10 may rewind and key-in on certain points in the sequence, and make any changes that are desired.

The virtual environment 115 and virtual vehicle 10 allows users 10 to quickly and easily create sequences representing choreographed shows for vehicles.

When the user 10 is satisfied with a sequence, the user may finalize the sequence to generate instructions for a physical vehicle 100 to perform the actions of the one or more co components of the vehicle to perform the sequence. The instructions include computer code for execution by one or more processors of the physical vehicle 100 to generate signals to activate/de-activate components according to the desired sequence. As many different vehicles have different software and/or hardware requirements, the software code generated for one vehicle may be different for another vehicle. The embodiments described herein automatically generate code for the selected vehicles, thereby making it very easy for a user to program the vehicle to perform the sequence.

Referring again to FIG. 4, the system is configured to generate a non-fungible token 120 representing the instructions to perform the developed sequence on a physical vehicle 100. Any known or yet-to-be-developed method of tokenizing a digital file(s) may be utilized to generate the non-fungible token 119. Ownership of the non-fungible token that is created may be recorded on a blockchain, such as the Ethereum blockchain, and may point to one or more digital files containing the instructions to control the physical vehicle to perform the sequence defining the choreographed show that was developed in the virtual environment.

The resulting non-fungible token 120 may be stored in a wallet, which may be accessed in a vehicle head unit 121, a mobile device, a web browser, and/or the like. Selecting the non-fungible token 120 causes the physical vehicle 100 to control the one or more components according to the sequence of the instructions of the non-fungible token to play the same choreographed show that was developed and played by the virtual vehicle 100V.

Figure 6:
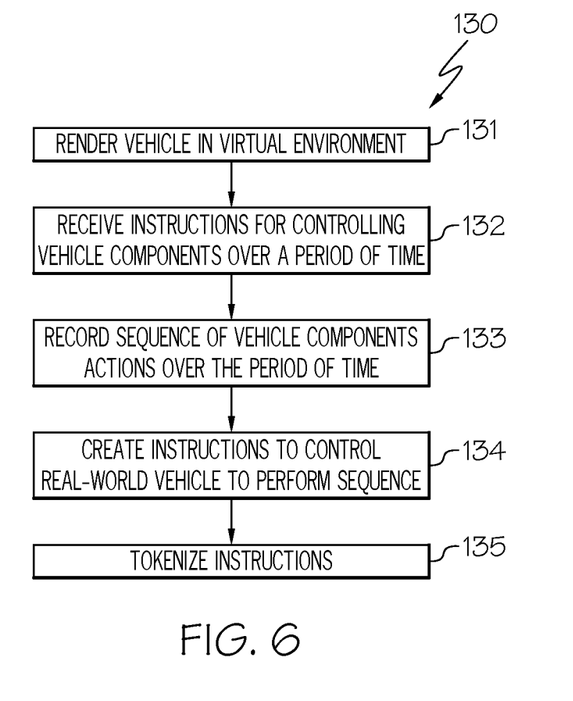
FIG. 6 illustrates a flowchart showing an example method of generating a non-fungible token for controlling a vehicle according to one or more embodiments described and illustrated herein.

Referring now to FIG. 6, a flowchart 130 illustrating an example method of generating a non-fungible token for controlling a physical vehicle is shown. At block 131, a virtual vehicle is rendered in a virtual environment for viewing by the user. As an example, the virtual vehicle and the virtual environment may be rendered by a virtual reality headset. The user may be able to move around the virtual vehicle, and even sit within it at different seat locations.

At block 132, the system receives instructions for controlling the vehicle components of the virtual vehicle over a period of time. As a non-limiting example, the user interface 117 of FIG. 5 may be used to enable the user to activate and de-activate the various vehicle components over the period of time. In some embodiments, the user may turn vehicle components on and off by touching them or making gestures toward them. Other means for performing vehicle component actions may be utilized.

The order of vehicle component actions (e.g., vehicle components turning on or off, vehicle components moving, and the like) creates a sequence of vehicle component actions.

At block 133 the system records the sequence of vehicle component actions developed by the user over a period of time. The user may "play" the vehicle sequence such that the virtual vehicle performs the sequence of vehicle component actions over the period of time. The user may make adjustments and edits to the sequence until she is satisfied with the results.

When the user is satisfied, she may designate the sequence as final. This may be done by selecting a virtual finalize button or other icon that is visible to the user. When the sequence is indicated as final, it is exported into one or more files that include instructions to control a real-world vehicle to perform the sequence of vehicle actions. As stated above, this step takes into account the make, model, trim level, and/or year to accommodate different vehicle controllers and different vehicle components. As a non-limiting example, instructions to turn on a light of a first vehicle may be different from instructions to turn on a light of a second vehicle. The instructions are created in a way so that they may be executed by one or more electronic control units (i.e., processors) of the intended physical vehicle such that the physical vehicle performs the sequence of vehicle component actions.

Next, at block 135 the instructions are tokenized and provided on a blockchain, such as, without limitation, the Ethereum blockchain. Any known or yet-to-be-developed method of generating a non-fungible token representing the instructions may be utilized. The non-fungible token ensures that only one set of instructions (or some other number) may be available. In other words, the non-fungible token provides authenticity for the instructions. The non-fungible token representing the instructions for the sequence of vehicle component actions may be traded, sold, leased, given away, rented, used as collateral, or any other designed action.

Figure 7:
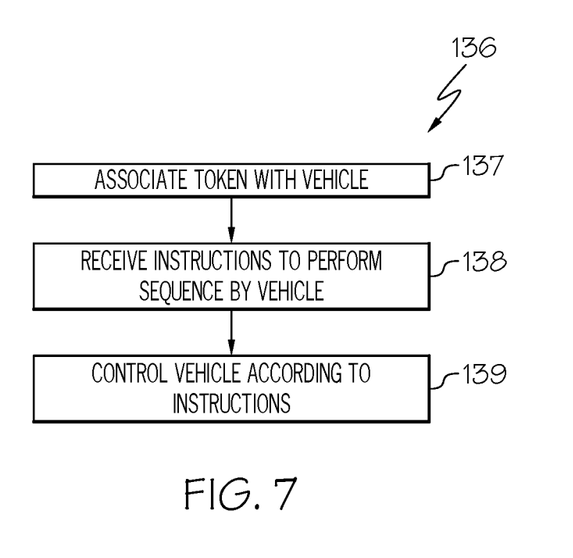
FIG. 7 illustrates a flowchart showing an example method of controlling a vehicle using a non-fungible token according to one or more embodiments described and illustrated herein.

As stated above, the non-fungible token may be used to control a real-world, physical vehicle such that it performs the sequence of vehicle actions. FIG. 7 is an example flowchart 136 illustrating a non-limiting method of controlling a vehicle using a non-fungible token. At block 137, a non-fungible token is associated with a physical vehicle. As an example, the vehicle may have a head unit that stores and displays a non-fungible token wallet that provides a list of all available non-fungible tokens. The head unit may be used to import a new non-fungible token. In other examples, a web browser or a mobile application may be used to associate a new non-fungible token with a user's wallet. A non-fungible token may be associated with the vehicle in any number of ways.

The vehicle may access the instructions of a selected non-fungible token. For example, when a user wants the vehicle to perform the sequence of vehicle actions, she may use a graphical user interface to select the desired non-fungible token as well as any other icons to cause the vehicle to start to play the sequence of vehicle actions. Upon selection, the vehicle electronic control unit(s) will read the instructions, which cause the vehicle components to activate and de-activate according to the instructions of the non-fungible token in block 139. The vehicle may perform the sequence of vehicle actions until the period of time is completed. In this manner, the non-fungible token may be used to control the vehicle to put on a performance according to the sequence of vehicle actions.

Figure 8:
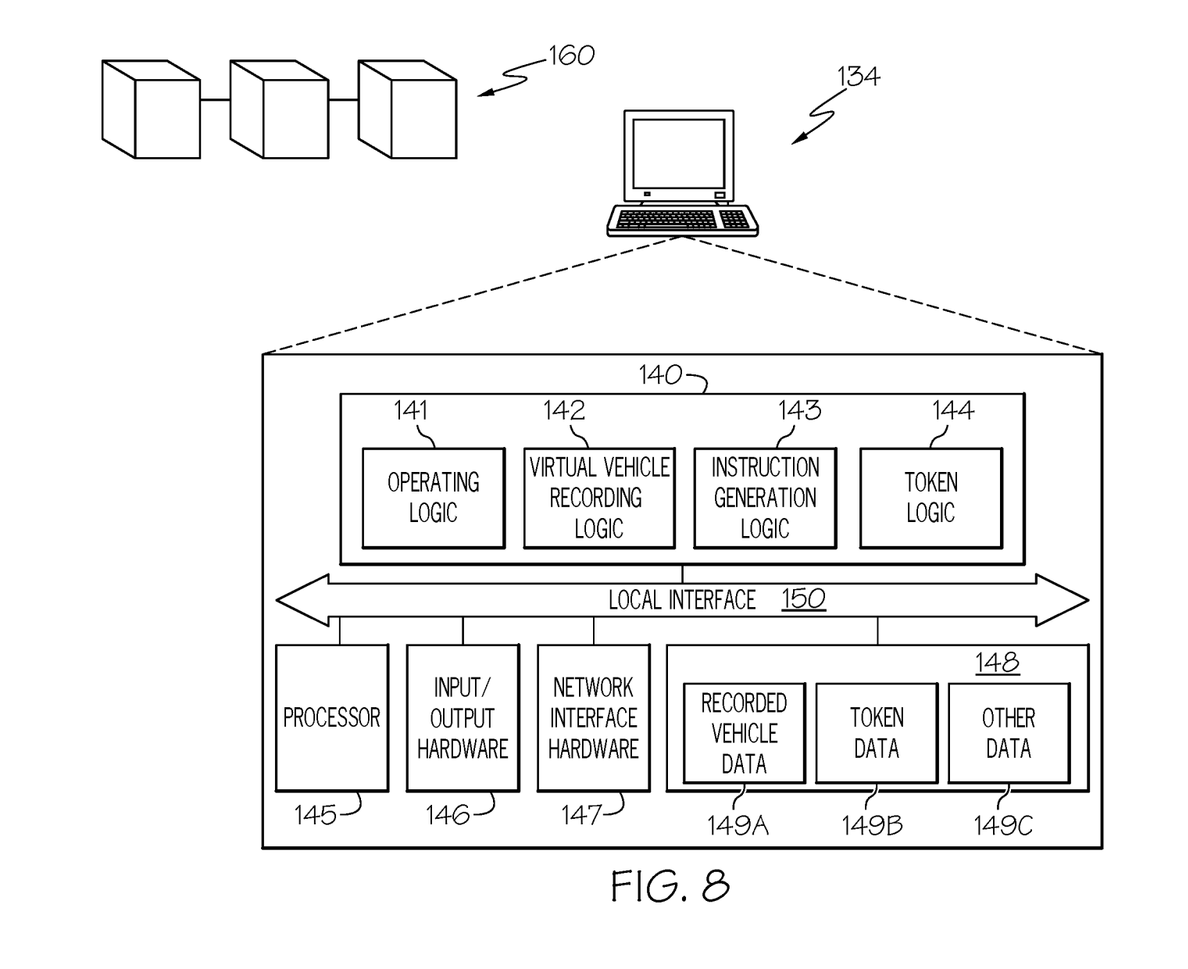
FIG. 8 illustrates a computing system for generating a non-fungible token for controlling a physical vehicle according to one or more embodiments described and illustrated herein.

Embodiments of the present disclosure may be implemented by a computing device, and may be embodied as computer-readable instructions stored on a non-transitory memory device. Referring now to FIG. 8 an example system for providing a virtual environment for generating tokens for controlling a physical vehicle configured as a computing device 134 is schematically illustrated. The example computing device 134 provides a system for providing a virtual environment for generating tokens for controlling a physical vehicle, and/or a non-transitory computer usable medium having computer readable program code for providing a virtual environment for generating tokens for controlling a physical vehicle embodied as hardware, software, and/or firmware, according to embodiments shown and described herein. While in some embodiments, the computing device 134 may be configured as a general purpose computer with the requisite hardware, software, and/or firmware, in some embodiments, the computing device 134 may be configured as a special purpose computer designed specifically for performing the functionality described herein. It should be understood that the software, hardware, and/or firmware components depicted in FIG. 8 may also be provided in other computing devices external to the computing device 134 (e.g., data storage devices, remote server computing devices, and the like).

As also illustrated in FIG. 8, the computing device 134 (or other additional computing devices) may include a processor 145, input/output hardware 146, network interface hardware 147, a data storage component 148 (which may include recorded vehicle data 149A (e.g., data regarding vehicle component actions of the virtual vehicle as well as instructions for controlling a physical vehicle), token data 149B (e.g., data relating to a non-fungible token of a sequence of vehicle component actions), and any other data 149C for performing the functionalities described herein), and a non-transitory memory component 140. The memory component 140 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 140 may be configured to store operating logic 141, virtual vehicle recording logic 142 for recording vehicle component actions, instruction generation logic 143 for generating instructions for a physical vehicle to execute to perform a sequence of vehicle actions, and token logic 144 for converting the instructions into a token for recording on a blockchain, such as a non-fungible token, as described herein (each of which may be embodied as computer readable program code, firmware, or hardware, as an example). It should be understood that the data storage component 148 may reside local to and/or remote from the computing device 134, and may be configured to store one or more pieces of data for access by the computing device 134 and/or other components.

A local interface 150 is also included in FIG. 8 and may be implemented as a bus or other interface to facilitate communication among the components of the computing device 134.

The processor 145 may include any processing component configured to receive and execute computer readable code instructions (such as from the data storage component 148 and/or memory component 140). The input/output hardware 146 may include virtual reality headset, graphics display device, keyboard, mouse, printer, camera, microphone, speaker, touch-screen, and/or other device for receiving, sending, and/or presenting data. The network interface hardware 147 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 140 may be the operating logic 141, virtual vehicle recording logic 142, instruction generation logic 143, and token logic 144. The operating logic 141 may include an operating system and/or other software for managing components of the computing device 134. The operating logic 141 may also include computer readable program code for displaying the graphical user interface used by the user to view and experience a virtual environment. Similarly, the virtual vehicle recording logic 142 may reside in the memory component 140 and may be configured to generate a virtual vehicle, enable a user to control vehicle components of the virtual vehicle, and record a sequence of vehicle component actions. The instruction generation logic 143 also may reside in the memory component 140 and may be configured to generate instructions for a physical vehicle to execute to perform the sequence of vehicle component actions. The token logic 144 includes logic to tokenize the instructions. Any known or yet-to-be-developed logic for tokenizing the instructions and providing the token on a blockchain may be utilized.

It should now be understood that embodiments of the present disclosure are directed to methods for generating non-fungible tokens for controlling a physical vehicle to enact a "performance" according to a sequence of vehicle component actions. The sequence of vehicle component actions may be flashing lights, moving wheel, playing of music, honking of a horn, and/or the like. A virtual environment in which a virtual vehicle is displayed is provided such that the user can develop the sequence of actions on the virtual vehicle. This provides the benefit of being able to see how the physical vehicle will look when performing the sequence. Embodiments also generate instructions for the vehicle to perform the sequence of vehicle component actions according to the make, model, trim level, and/or year of the virtual and physical vehicle. Further, embodiments store the instructions as a non-fungible token, which provides authenticity and value to the instructions for performing the sequence of vehicle actions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of generating a non-fungible token for controlling a physical vehicle, the method comprising:
   generating a virtual vehicle within a virtual environment, wherein the virtual vehicle corresponds to the physical vehicle;
   receiving, within the virtual environment, requests corresponding to a sequence of actions for one or more virtual vehicle components;
   controlling the virtual vehicle such that the virtual vehicle performs the sequence of actions;
   generating instructions for performing the sequence of actions by the physical vehicle; and
   generating the non-fungible token, wherein the non-fungible token comprises the instructions for performing the sequence of actions by the physical vehicle such that the non-fungible token is configured to control one or more physical vehicle components of the physical vehicle to perform the sequence of actions.

2. The method of claim 1, wherein the virtual environment comprises a virtual reality environment.

3. The method of claim 1, wherein the virtual environment comprises an augmented reality environment.

4. The method of claim 1, wherein the one or more virtual vehicle components correspond to the one or more physical vehicle components.

5. The method of claim 1, wherein the one or more virtual vehicle components and the one or more physical vehicle components each comprises one or more of vehicle headlights, vehicle front turn signals, vehicle tail lights, vehicle rear turn signals, vehicle brake lights, vehicle interior lights, vehicle wheels, vehicle side mirrors, and vehicle sound system.

6. The method of claim 1, wherein the sequence of actions comprises controlling a sound system to play audio over a period of time, and to control one or more lights of the virtual vehicle and the physical vehicle over at least a portion of the period of time.

7. A method of controlling a vehicle, the method comprising:
   receiving, by one or more processors of a vehicle, a non-fungible token comprising instructions for controlling one or more components of the vehicle such that the one or more components perform a sequence of actions; and
   executing, by the one or more processors, the instructions to generate a plurality of signals, wherein the plurality of signals control the one or more components such that the one or more components perform the sequence of actions.

8. The method of claim 7, wherein the non-fungible token is provided on a blockchain.

9. The method of claim 7, wherein the one or more components comprises one or more of vehicle headlights, vehicle front turn signals, vehicle tail lights, vehicle rear turn signals, vehicle brake lights, vehicle interior lights, vehicle wheels, vehicle side mirrors, and vehicle sound system.

10. The method of claim 7, wherein the sequence of actions comprises controlling a sound system to play audio over a period of time, and to control one or more lights of the vehicle over at least a portion of the period of time.

11. The method of claim 7, further comprising:
    displaying one or more non-fungible tokens comprising instructions for controlling the one or more components of the vehicle on a display within the vehicle; and
    receiving a selection of the non-fungible token from the one or more non-fungible tokens by way of the display.

12. A method of controlling a physical vehicle, the method comprising:
    generating a virtual vehicle within a virtual environment, wherein the virtual vehicle corresponds to the physical vehicle;
    receiving, within the virtual environment, requests corresponding to a sequence of actions for one or more virtual vehicle components;
    controlling the virtual vehicle such that the virtual vehicle performs the sequence of actions;
    generating instructions for performing the sequence of actions by the physical vehicle;
    generating a non-fungible token, wherein the non-fungible token comprises the instructions for performing the sequence of actions by the physical vehicle such that the non-fungible token is configured to control one or more physical vehicle components of the physical vehicle to perform the sequence of actions;
    receiving, by one or more processors of a vehicle, the non-fungible token; and
    executing, by the one or more processors, the instructions to generate a plurality of signals, wherein the plurality of signals control the one or more physical vehicle components such that the one or more physical vehicle components perform the sequence of actions.

13. The method of claim 12, wherein the virtual environment comprises a virtual reality environment.

14. The method of claim 12, wherein the virtual environment comprises an augmented reality environment.

15. The method of claim 12, wherein the one or more virtual vehicle components correspond to the one or more physical vehicle components.

16. The method of claim 12, wherein the one or more virtual vehicle components and the one or more physical vehicle components each comprises one or more of vehicle headlights, vehicle front turn signals, vehicle tail lights, vehicle rear turn signals, vehicle brake lights, vehicle interior lights, vehicle wheels, vehicle side mirrors, and vehicle sound system.

17. The method of claim 12, wherein the sequence of actions comprises controlling a sound system to play audio over a period of time, and to control one or more lights of the virtual vehicle and the physical vehicle over at least a portion of the period of time.

18. The method of claim 12, wherein the non-fungible token is provided on a blockchain.

19. The method of claim 12, further comprising:
    displaying one or more non-fungible tokens comprising instructions for controlling one or more components of the vehicle on a display within the vehicle; and
    receiving a selection of the non-fungible token from the one or more non-fungible tokens by way of the display.

20. The method of claim 12, wherein the one or more physical vehicle components comprises an external speaker.

* * * * *